(12) United States Patent
Kwan

(10) Patent No.: US 8,055,670 B2
(45) Date of Patent: Nov. 8, 2011

(54) SYSTEM AND METHOD FOR THE GENERATION OF REPLACEMENT TITLES FOR CONTENT ITEMS

(75) Inventor: Remi Kwan, Quebec (CA)

(73) Assignee: Yahoo! Inc., Sunnyvale, CA (US)

( * ) Notice: Subject to any disclaimer, the term of this patent is extended or adjusted under 35 U.S.C. 154(b) by 518 days.

(21) Appl. No.: 11/837,920

(22) Filed: Aug. 13, 2007

(65) Prior Publication Data

US 2009/0049478 A1 Feb. 19, 2009

(51) Int. Cl.
*G06F 7/00* (2006.01)
*G06F 17/30* (2006.01)
(52) U.S. Cl. ............. 707/765; 707/780; 707/804; 704/9
(58) Field of Classification Search .......... None
See application file for complete search history.

(56) References Cited

U.S. PATENT DOCUMENTS

| 6,490,579 | B1* | 12/2002 | Gao et al. .................. 707/4 |
| 2006/0190436 | A1* | 8/2006 | Richardson et al. ........ 707/3 |
| 2006/0241944 | A1* | 10/2006 | Potter et al. .................. 704/254 |
| 2007/0250576 | A1* | 10/2007 | Kumar et al. ............... 709/206 |
| 2008/0147637 | A1* | 6/2008 | Li et al. ..................... 707/5 |
| 2008/0177875 | A1* | 7/2008 | Denney et al. ............ 709/224 |

* cited by examiner

*Primary Examiner* — Alicia Lewis
(74) *Attorney, Agent, or Firm* — Seth H. Ostrow; Ostrow Kaufman LLP

(57) ABSTRACT

Systems, methods and computer program products for generating substitute titles for a content item in response to a user submitted title for the content item. A method receives a user generated title and generates a plurality of candidate substitute titles. A first quality score is calculated for the user generated title and a plurality of second quality scores are generated for the plurality of candidate substitute titles. The user generated title for the content item is replaced with at least one of the plurality of candidate substitute titles on the basis of the quality scores.

20 Claims, 4 Drawing Sheets

SYSTEM AND METHOD FOR THE GENERATION OF REPLACEMENT TITLES FOR CONTENT ITEMS

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to identifying content items. More specifically, the embodiments of the invention are directed towards systems, methods and computer program products for generating one or more substitute titles for a given content item in response to user submission of the given content item.

BACKGROUND OF THE INVENTION

The systems and methods of the present invention are directed towards the educated replacement of a title for a user defined or supplied content item. In certain types of databases, such as a question and answer database such as YAHOO! ANSWERS™, users may enter title data in a free-form manner, thus resulting in malformed or otherwise unhelpful title data. Using such systems, a search engine returns title data for content items that users supply as a ranked list of content item titles, such as question titles. Malformed titles, such as "ipods???" or "can someone help me?" provide little information to a user performing a title search of the database. This results in a poor search results page that may prove inefficient and costly, especially on client devices where the review of a substantial number of items in a search result set incurs additional costs, such as on PDAs, cell phones and other mobile devices with limited screen space or bandwidth.

Although titles may be malformed, the body of a content item often contains a wealth of information related to the subject or topic of the content item. Additionally, other data resident within the database may aid in the construction of a more relevant title for a given content item. For example, in a question and answer database, the content of answers to a question may further outline the true subject matter of the question and, therefore, the title.

There is thus a need in the art for systems, methods and computer program products for analyzing content items within a database to provide alternative titles that more clearly define the subject or topic of a content item. Specifically, a need exists in a questions and answers database to replace uninformative titles with more succinct and informative titles that may be generated using the content of the question itself.

SUMMARY OF THE INVENTION

The present invention is directed towards systems and methods for generating substitute content items in response to a user submitted content item. The method of the present invention comprises receiving a user generated content item and generating a plurality of candidate substitute content items. One embodiment contemplates that the user generated content item comprises a title and body. Generating a plurality of candidate substitute content items may further comprise generating a substitute title based on said user generated content item title and body.

A quality score is then calculated for the user generated content item and the plurality of candidate substitute content items. In one embodiment, a quality score is generated based upon a rules-based heuristic score. In an alternative embodiment, a quality score is generated based on a statistical model.

A user generated content item is then replaced with at least one of said plurality of candidate substitute content items based on said quality scores. In one embodiment, replacing said user generated content item is based on a heuristic decision. In an alternative embodiment, replacing said user generated content item is based on the output of a statistically trained classifier.

Although the method may be performed as a batch process, alternative embodiments may exist in which the method is performed in response to user input or in real-time.

The present invention is further directed towards a system for generating substitute content items in response to a user submitted content item. The system comprises a plurality of client devices coupled to a network and a content provider coupled to said network operable to receive a user generated content item. A user generated content item may comprise a title and body.

The system further comprises a candidate segmentation and identification module operable to generate a plurality of candidate substitute content items. In one embodiment, generating a plurality of candidate substitute content items comprises generating a substitute title based on said user generated content item title and body.

The system further comprises a quality score module operable to calculate a quality score of a received user generated content item and a plurality of quality score corresponding to a plurality of generated candidate substitute content items. In one embodiment, the quality score is generated based upon a rules-based heuristic score. In an alternative embodiment, the quality score is generated based on a statistical model.

The system further includes a title replacement module operable to replace said user generated content item with at least one of said plurality of candidate substitute content items based on said quality scores. In one embodiment, replacing said user generated content item is based on a heuristic decision. In an alternative embodiment, replacing said user generated content item is based on the output of a statistically trained classifier. Alternatively, the title replacement module may forgo replacing the user generated content item, e.g., where the user generated content item has a sufficiently high quality score.

Although the system may operate as a batch process, alternative embodiments may exist wherein the system operates in response to user input of a title or in real-time in response to a search.

BRIEF DESCRIPTION OF THE DRAWINGS

The invention is illustrated in the figures of the accompanying drawings which are meant to be exemplary and not limiting, in which like references are intended to refer to like or corresponding parts throughout, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
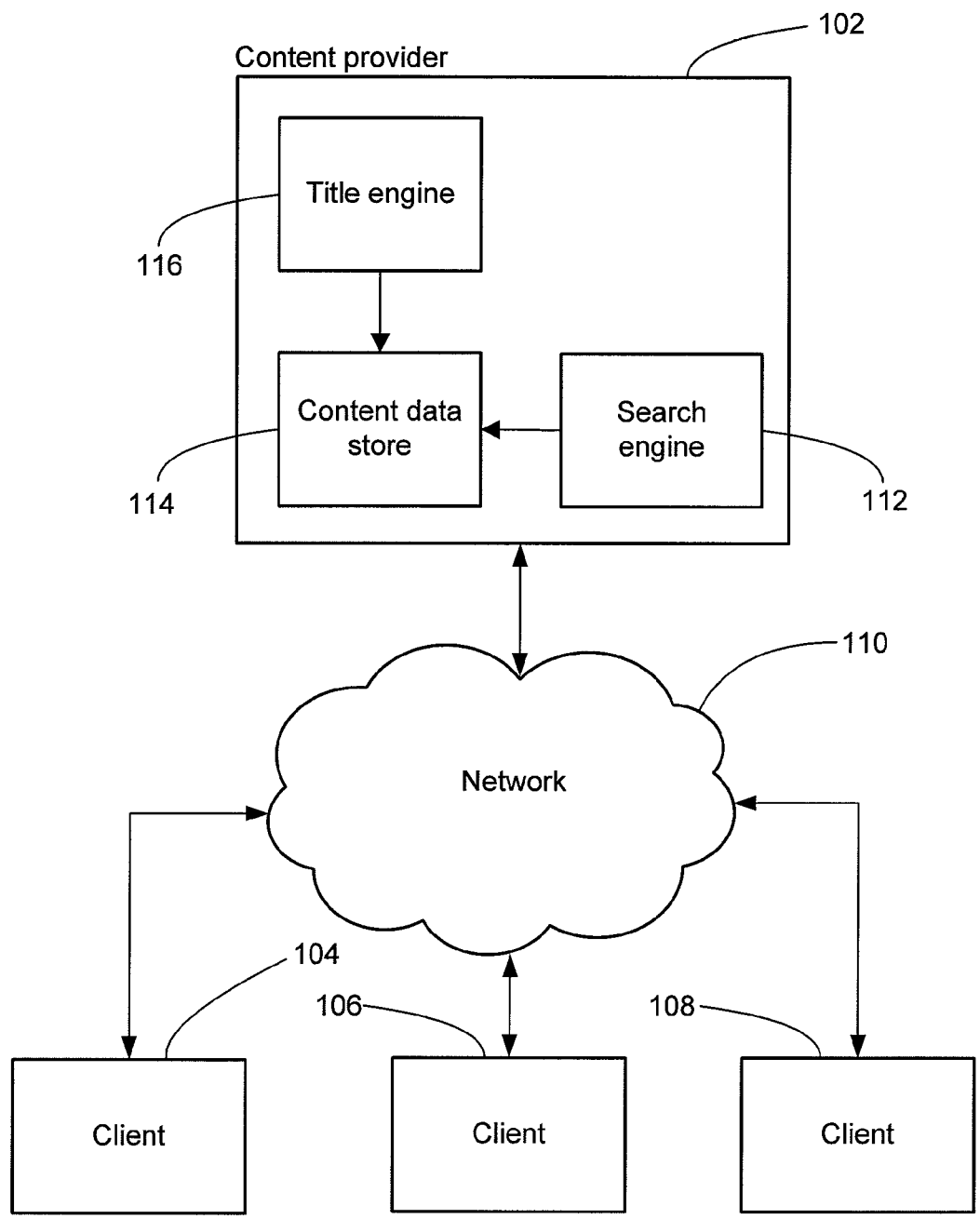
FIG. 1 is a block diagram illustrating a system for generating replacement titles using machine learning techniques according to one embodiment of the present invention.

FIG. 1 presents a block diagram illustrating one embodiment of a system for generating replacement titles using machine learning techniques. According to the embodiment that FIG. 1 illustrates, one or more client devices 104, 106 and 108 are communicatively coupled to a network 110, which may include a connection to one or more local and wide area networks, such as the Internet. According to one embodiment of the invention, a given client device 104, 106 and 108 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 104, 106 and 108 may be in communication over the network 110 with a content provider 102 that hosts one or more content items present within a content data store 114. As previously discussed, the content provider 102 may also comprise a repository 114 for the storage and transmission of one or more content items in response to a request from a client device 104, 106 and 108. For example, the content provider 102 may comprise a web site that includes a content server (e.g., Apache™, Internet Information Server™, etc.) and a data store, which according to one embodiment is a database that maintains web pages in an organized and structured manner. The content provider 102 may further maintain program code that, when executed by the content provider 102, is operative to dynamically generate one or more content items.

The content provider 102 may further comprise a search engine 112 operative to receive search requests from one or more client devices 104, 106 and 108. A search request may be generated by a given client 104, 106 and 108 through the use of a search engine page that comprises an HTML form element, such as an INPUT element. A search request may be formed via the search engine page and transmitted over network 110 via an HTTP request from the client 104, 106 and 108 to the search engine 112.

The search engine 112 may further be operative to receive the search requests from a client device 104, 106 and 108 and return relevant search results that fall within the scope of the search request that the search engine 112 receives. The search engine 112 may utilize the received search request and return links to one or more content items that the search engine 112 fetches from content data store 114. The content data store 114 may store content items for serving as search results in accordance with any means known in the art to store search results. For example, an index of web pages may be stored and utilized to identify one or more relevant content items to serve as search results within the content store 114. An exemplary content data store 114 may maintain one or more content items, as given content item comprising one or more fields and including at least a title field.

The content provider 102 may comprises a title engine 116 that is operative to manipulate or otherwise modify the titles of content items that the content data store 114 maintains. According to one embodiment, the title engine 116 is operative to examine content items that the content data store 114 maintains independently of other components of content provider 102, as well as modify existing titles of content items within the content data store 114. In an alternative embodiment, title engine 116 may be operative to dynamically generate titles on the basis of existing titles that the content provider 102 receives. For example, in an embodiment comprising a questions and answers database, the title engine 116 may be operative to examine a newly created question title and provide a list of more relevant titles prior to insertion of the content item into the content data store 114. As described in greater detail herein, the title engine 116 may dynamically generate titles, e.g., on the basis of user search queries.

Figure 2:
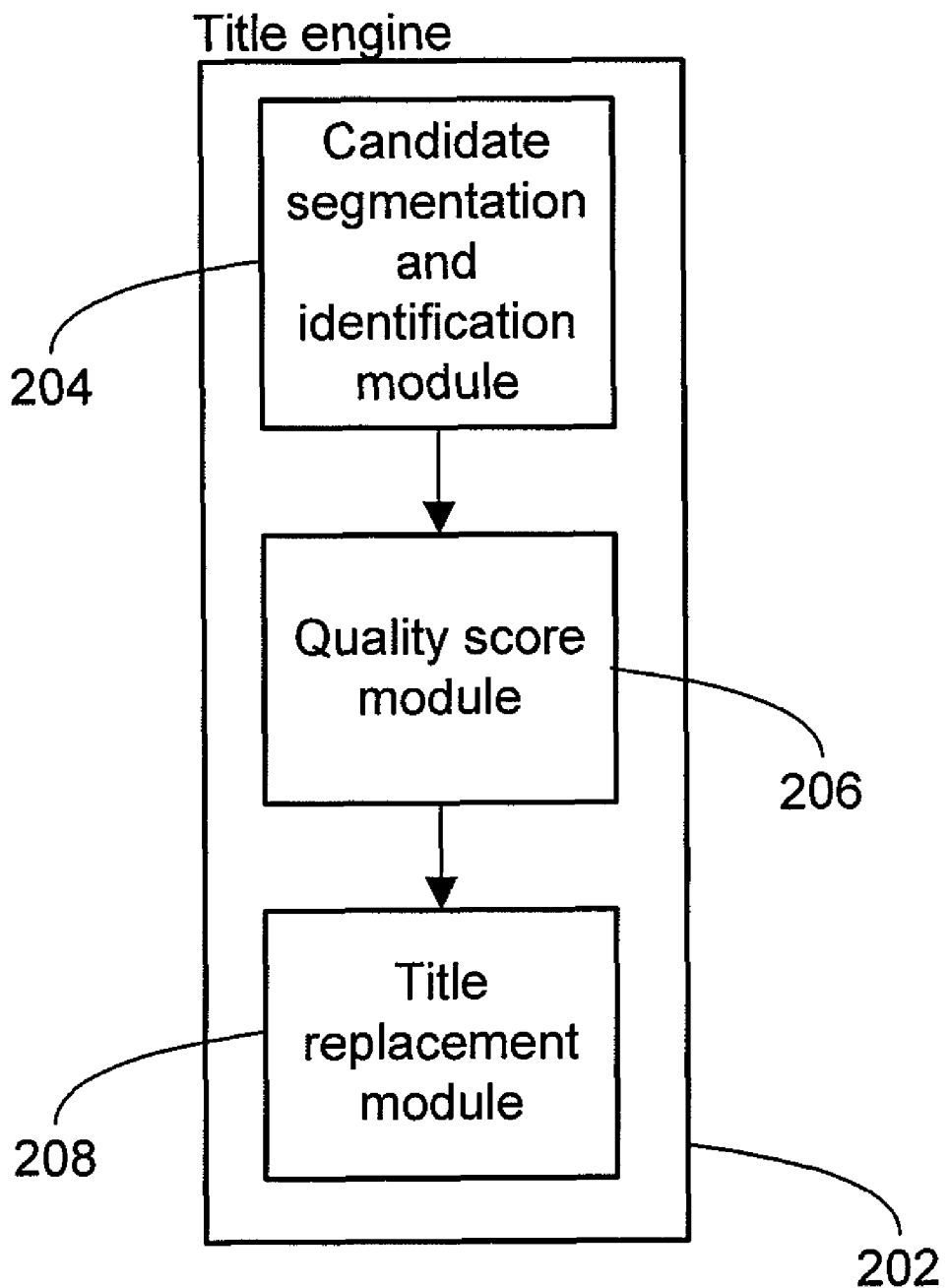
FIG. 2 is a block diagram illustrating a title engine for generating replacement titles according to one embodiment of the present invention.

FIG. 2 illustrates a title engine according to one embodiment of the present invention in greater detail. As the embodiment of FIG. 2 illustrates, the title engine 202 comprises a candidate segmentation and identification ("CSI") module 204, a title replacement module 206 and a quality score module 208.

The CSI module 204 may be operative to receive one or more of content items from a database (not shown). According to one embodiment, the CSI module 204 is operative to receive content items comprising question and answer data from a questions and answers database. For example, a database may store questions from users comprising at least a question title and question body and may further comprise corresponding answers from other users.

The CSI module 204 may be operative to parse the question body to determine at least one substitute title. For example, a question may comprise a non-descriptive title such as "patent examiner??" and a more descriptive body such as "I was interested in becoming a patent examiner, how does one go about this?". The CSI module 204 may be operative to parse through at least the question body to formulate a title that may describe the question body. For example, the title "How do I become a patent examiner?" may be generated by CSI module 204 in response to the question body "I was interested in becoming a patent examiner, how does one go about this?".

Alternatively, or in conjunction with the foregoing, the CSI module 204 may be operative to parse the question body on the basis of text-processing segmentation, e.g., occurrences of punctuation (".", "?", "!"). For example, consider the following question: "I was told you need an engineering degree to become a patent examiner. Is that true? What are the requirements for becoming a patent examiner? And where can I find out more?". Using text-processing segmentation, the foregoing example would produce four candidates.

In alternative embodiments, the CSI module 204 may utilize existing answers to a given question to generate substitute question titles. In still a further embodiment, the CSI module 204 may analyze the selected question body and formulate a substitute question title based upon one or more related or otherwise similar questions that a question and answer database maintains.

Once the CSI module 204 generates a substitute question title, a quality score is determined for the substitute question title by a quality score module 206. According to one embodiment, the quality score module 206 is operative to assign a quality score to a given question title and one or more potential substitute question titles that the CSI module 204 generates. According to one embodiment, the quality score module 206 may generate a quality score on the basis of a heuristic score comprising one or more rules. In accordance with an alternative embodiment, the quality score module 206 may generate a quality score through the use of a statistical model, which the title engine 202 may train offline.

The quality score that the quality score module 206 determines may be based on a plurality of features including, but not limited to, the length of the candidate substitute title, the words of the candidate substitute title, capitalization, presence or absence of punctuation, the distribution of words, the distribution of word lengths, the distribution of characters, position of the candidate substitute title within the content item, word matches between the candidate substitute title and answers or the candidate and original title. Furthermore, where the quality score module 206 implements scoring in real-time, the quality score module 206 may base the quality score on real-time factors including, but not limited to, word matches between the candidate and an search query that the user provides.

Figure 3:
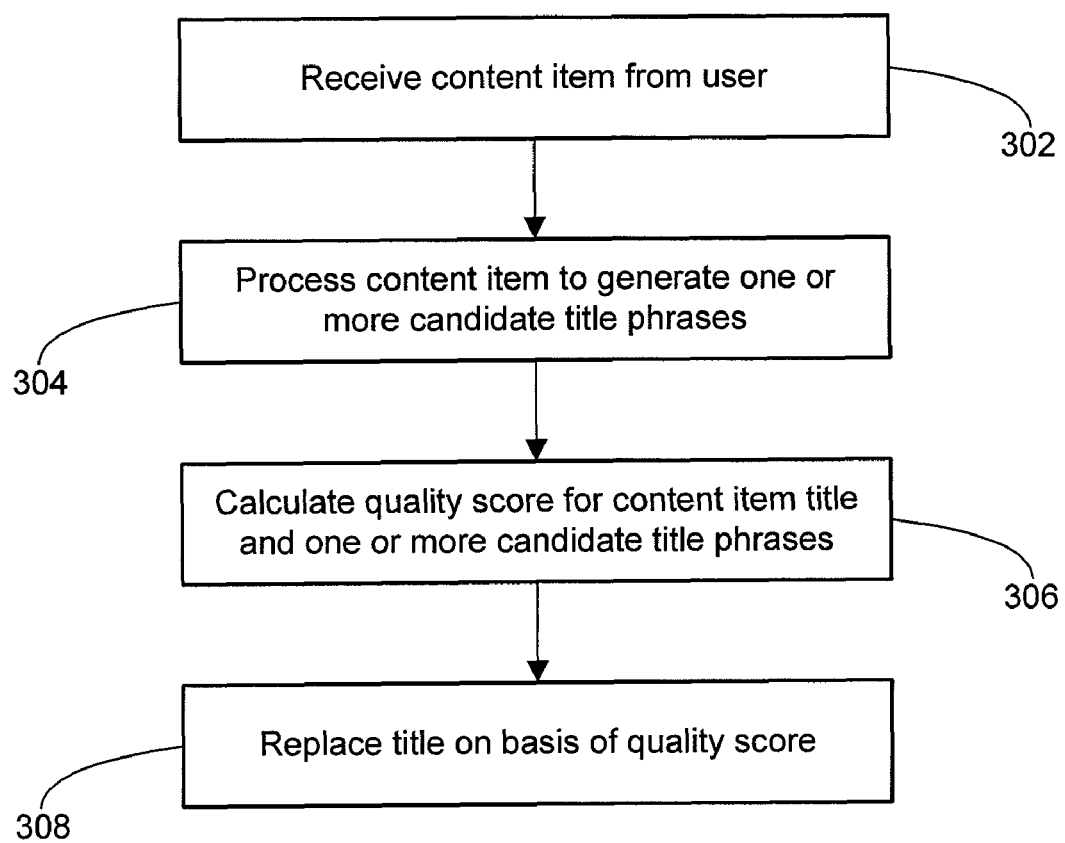
FIG. 3 is a flow diagram illustrating a method for replacing a title on the basis of a quality score according to one embodiment of the present invention.

Title replacement module 208 may receive the original title for the given content item and one or more candidate substitute titles. According to one embodiment, the title replacement module 208 is operative to determine a highest quality title from among one or more candidate substitute titles on the basis of the associated quality scores. Similar to the quality score module 206, the title replacement module 208 may determine an optimum title on the basis of a heuristic that the title replacement module 208 applies to the quality scores, which may include various other parameter, such as title length. Alternatively, the title replacement module 208 may utilize a statistically trained classifier to determine an optimum title FIG. 3 is a flow diagram illustrating a method for replacing a title for a content item on the basis of a quality score according to one embodiment of the present invention. As FIG. 3 illustrates, a content item is received from the user, step 302. In accordance with one embodiment, a content item may comprise a title of a question. For example, a user may submit a question to a content provider such as "tickets???" wherein the body of the question comprises a question such as "I'm looking for a cheap vacation package including a flight to San Diego. What website has the best deals on airline tickets?"

After receiving the content item, the content item is processed to generate one or more candidate substitute titles, step 304. The generation of candidate substitute titles may proceed on the basis of the body of a content item, such as the body of a question. Continuing the previous example, the user-defined title ("tickets???") may be determined to be of little significance, that is, if the title was returned as an item in search result set, the title would provide little guidance as to the relevancy of the question and subsequent answers to a given user search. The body of the question ("i'm looking for a cheap vacation package including a flight to San Diego. What website has the best deals on airline tickets?"), however, comprises more detail as to the subject or topic of the question. According to one embodiment, text processing may be operative to generate a meaningful candidate substitute title from the question body such as, "What website has the best deals on airline tickets?", and may replace the existing non-descriptive title with the generated candidate substitute title. Although a simplistic text-processing algorithm is illustrated as a method of generating a relevant title, the method may utilize other higher complexity algorithms known to those of skill in the art.

The method generates a quality score for a given candidate substitute title, step 306. According to one embodiment, the quality score is based on a heuristic comprising one or more rules. In accordance with alternative embodiments, the quality score may be generated through the use of a statistical model. Training of the statistical model may proceed in accordance with offline learning techniques, for example a regression against supervised quality judgment.

The quality score may be based on features or characteristics of a given candidate substitute title such as the length of the candidate substitute title, the words of the candidate substitute title, capitalization, presence or absence of punctuation, the distribution of words, the distribution of word lengths, the distribution of characters, position of the candidate substitute title within the content, word matches between the candidate substitute title and answers or the candidate substitute title and original title.

The title may be replaced by a candidate substitute title on the basis of the quality score of the candidate substitute title, step 308. That is, if a quality score of one of a plurality of a given candidate substitute title is greater than the quality score of the existing title and the quality scores of the remaining candidate substitute titles, the original title may be replaced with the more descriptive candidate substitute title having a highest quality score.

Figure 4:
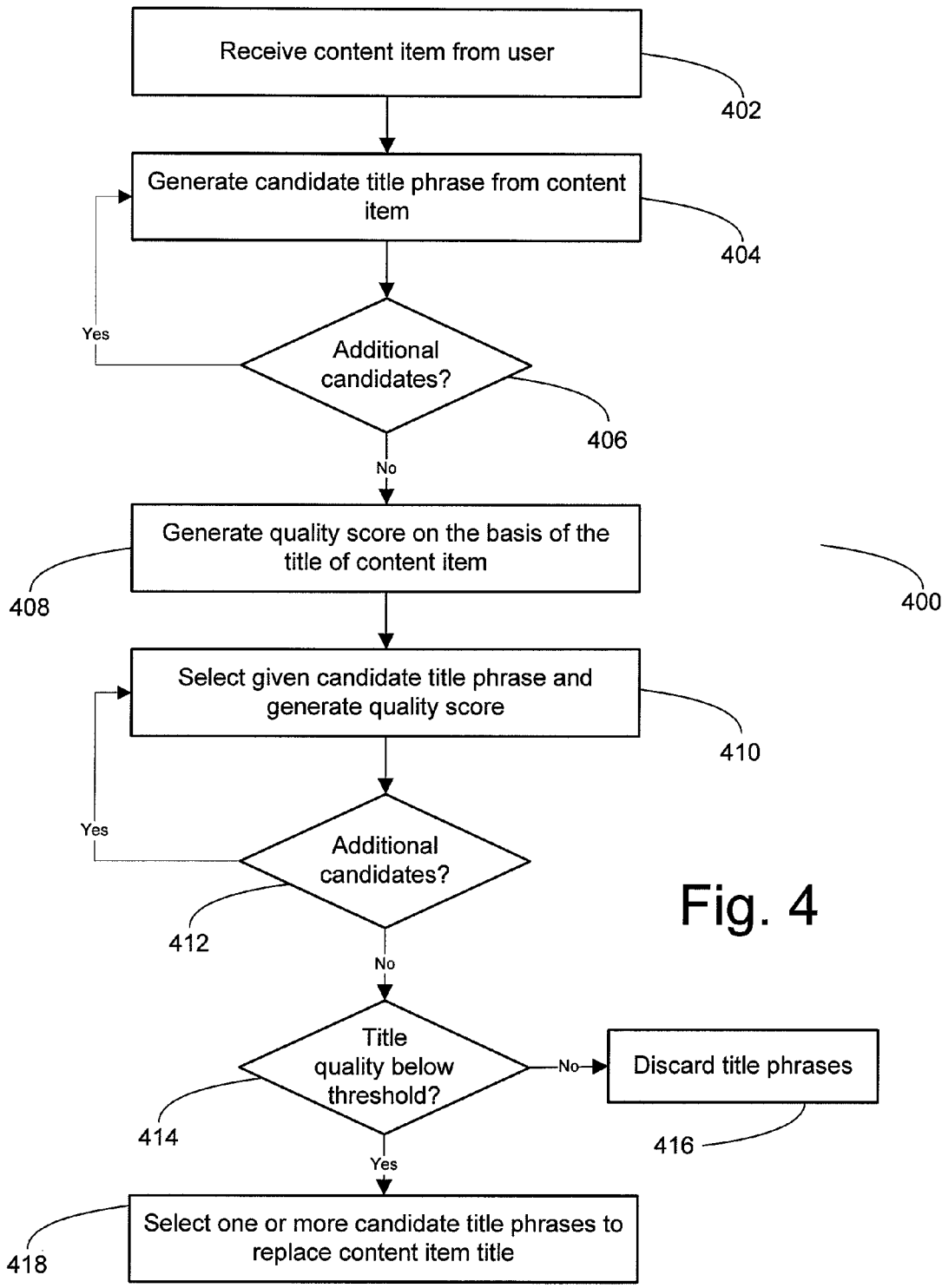
FIG. 4 is a flow diagram illustrating another method for replacing a title on the basis of a quality score according to one embodiment of the present invention.

FIG. 4 is a flow diagram illustrating a method for replacing a title of a content item on the basis of a quality score for one or more candidate substitute titles according to another embodiment of the present invention. As FIG. 4 illustrates, a content item is received from a user, step 402. A content item may comprise a title of a question and a body of the question. For example, a user may submit a question to a content provider such as "ipods???" wherein the body of the question comprises a question such as "I'm looking for a way to replace the battery in my ipod. What website has the best deals on ipod batteries?"

After receiving the content item, a candidate substitute title is generated from the content item, step 404. As previously described, candidate substitute titles may be generated based on the body of a content item, such as the body of a question. Alternatively, a candidate substitute title may be generated on the basis of a plurality of question answers or a combination of question answers and the question body. Candidate substitute title may be continually generated until the production of a maximum number of candidate substitute title, step 406.

A plurality of candidate titles may be generated and a quality score is generated for the original title of the content item, step 408. The quality score for the original title of the content item may correspond to a base quality score of a user generated question title and form the basis of comparison with one or more candidate substitute titles. Subsequently, a candidate substitute title may be selected and a quality score generated for the selected title, step 410. As previously described, the quality score may be based on a heuristic comprising one or more certain rules. In accordance with alternative embodiments, the quality score may be generated through the use of a statistical model. The statistical model may be trained offline using machine learning techniques, for example a regression against supervised quality judgment for candidate substitute title in a set of training data. The process of generating a quality score for a candidate substitute title may be repeated for one or more candidate substitute titles, step 412.

If the quality score of a given candidate substitute title (which may comprise both automatically generated and user generated candidate substitute titles) is below a quality score threshold (step 414), the title is discarded, step 416. In accordance with one embodiment, the determination of a quality score threshold score may proceed prior to the operation of method of FIG. 4. For example, a quality score based on heuristic score may comprise the range of values zero through 100, inclusive. A threshold of 70 may be determined to be the minimum quality score for consideration of a given candidate substitute title for replacement of an original title for a given content item. Alternatively, a statistical score (as opposed to a heuristic) may be utilized to optimize the precision and recall of candidates, as well as simplify the application of a global threshold.

One or more remaining candidate substitute titles may be analyzed and at least one candidate substitute title selected as a replacement title for the content item, step 418. In one embodiment, a title limit may be placed on the method of FIG. 4. For example, a given value may dictate that the maximum number of candidate substitute titles utilized in title replace may be a constant value, for example, four titles. In one embodiment, the top four titles, ranked by quality score, are selected and utilized for replacement of the original title for the content item. It should be noted that the original title may be among the one or more titles selected for replacement where the original title phrase is associated with a sufficiently high quality score. Similarly, a title length limit may be placed on the method of FIG. 4. For example, a given value may dictate that the maximum number of characters is 40. The title length limit may also be device dependent, e.g., a 40 character limit on a mobile device but no limit on a desktop computer.

In one embodiment, the method of FIG. 4 may be executed as a batch process. For example, execution of the method on a plurality of stored content items resident in a database. In an additional embodiment, the method 400 may be executed at runtime. For example, in response to a user entering a title for a given content item, one or more candidate substitute titles maybe generated according to the method presented in FIG. 4 and for presentation to the user. In response, a user may select a substitute candidate title. In an additional embodiment, the method 400 may be performed in real time. For example, a user may enter a search query for one or more relevant question/answer pairs. The method 400 may then utilize the question and answer data as well as the user search query to generate a plurality of substitute candidate titles. Similarly, this may be used in conjunction with predetermined or filtered candidates generated using the processes described above.

In addition to the foregoing, execution of the method 400 at runtime may utilize results returned from a user search to emphasize differences or similarities between results to assist in guiding the user to a result that he or she may find useful. According to one embodiment, the system uses the methods described herein to generate a title for a first content item in a search result set. For a second result, the method may utilize the title of the first result as information in determining a substitute title for the second result. Similarly, the system may utilize the titles of the first result and second result in determining a substitute title for the third result, etc.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for replacing a title for a content item in response to a user generated content item, the method comprising:
   receiving a user generated content item including a user generated title and a user generated content body, said user generated content item representing a question or answer in a question and answer environment;
   identifying a plurality of related questions and answers, wherein identifying a plurality of related questions and answers comprises accessing a question and answer database and identifying a plurality of question and answer pairs that are related to user generated content body;
   generating a plurality of candidate substitute titles for the content item, the candidate substitute titles based on the user generated content body and the plurality of related questions and answers;
   calculating a first quality score for the user generated title;
   calculating an individual quality score for each of the plurality of candidate substitute titles; and
   replacing the user generated title with at least one of the plurality of candidate substitute titles on the basis of the quality scores associated with the candidate substitute titles, wherein replacing the user generated title is based on the output of a statistically trained classifier.

2. The method of claim 1, wherein generating the plurality of candidate substitute titles comprises generating a substitute title based on the title and the body.

3. The method of claim 1, wherein the first quality score is generated on the basis of a heuristic.

4. The method of claim 1, wherein the quality score is generated on the basis of a statistical model.

5. The method of claim 1, comprising performing the method as a batch process.

6. The method of claim 1, comprising performing the method in response to user input of a title.

7. A computerized system embedded within a networked, hardware system for replacing a title for a content item in response to a user generated content item, the system comprising:
   a content provider device coupled to a network and configured to receive a user generated content item including a user generated title and a user generated content body, said user generated content item representing a question or answer in a question and answer environment;
   a candidate segmentation and identification ("CSI") device coupled to the content provider configured to:
   identify a plurality of related questions and answers, wherein identifying a plurality of related questions and answers comprises accessing a question and answer database and identifying a plurality of question and answer pairs that are related to user generated content body; and
   generate a plurality of candidate substitute titles, the candidate substitute titles based on the received user generated content body and the plurality of related questions and answers;
   a quality score device coupled to the content provider configured to calculate a quality score of a user generated title for a content item and a plurality of quality scores corresponding to a plurality of candidate substitute titles; and
   a title replacement device coupled to said content provider configured to replace the user generated title with at least one of said plurality of candidate substitute titles based on the quality scores associated with the candidate substitute titles, wherein replacing the user generated title is based on the output of a statistically trained classifier.

8. The system of claim 7, wherein the CSI generates the plurality of candidate substitute titles based the title and the body.

9. The system of claim 7, wherein the quality score device is configured to generate the quality score on the basis of a heuristic.

10. The system of claim 7, wherein the quality score device is configured to generate the quality score on the basis of a statistical model.

11. The system of claim 7, wherein the system operates as a batch process.

12. The system of claim 7, wherein the system operates in response to user input of a title.

13. The system of claim 7, wherein the system operates in real-time in response to a search.

14. Computer readable media comprising program code that when executed by a programmable processor causes execution of a method for replacing a title for a content item in response to a user generated content item, the computer readable media comprising:
   program code for receiving the user generated content item including a user generated title and a user generated content body, said user generated content item representing a question or answer in a question and answer environment;
   program code for identifying a plurality of related questions and answers, wherein identifying a plurality of related questions and answers comprises accessing a question and answer database and identifying a plurality of question and answer pairs that are related to user generated content body;
   program code for generating a plurality of candidate substitute titles for the content item, the candidate substitute titles based on the received user generated content body and the plurality of related questions and answers;
   program code for calculating a first quality score for the user generated title;
   program code for calculating an individual quality score for each of the plurality of candidate substitute titles; and
   program code for replacing the user generated title with at least one of the plurality of candidate substitute titles on the basis of the quality scores associated with the candidate substitute titles, wherein replacing the user generated title is based on the output of a statistically trained classifier.

15. The computer readable media of claim 14, wherein the first quality score is generated on the basis of a heuristic.

16. The computer readable media of claim 14, wherein the quality score is generated on the basis of a statistical model.

17. The computer readable media of claim 14, comprising program code for performing the method as a batch process.

18. The computer readable media of claim 14, comprising program code for performing the method in response to user input of a title.

19. The computer readable media of claim 14, comprising program code for performing the method in real-time in response to a search.

20. The computer readable media of claim 14, wherein program code for generating the plurality of candidate substitute titles comprises program code for generating a substitute title based on the title and the body.

* * * * *